R. P. HICKS.
POWER TRANSMISSION MECHANISM.
APPLICATION FILED MAY 12, 1919.

1,324,592.

Patented Dec. 9, 1919.
2 SHEETS—SHEET 1.

WITNESSES.
H. W. Chase
E. L. Naal

INVENTOR.
Rex P. Hicks
By R. S. Caldwell
ATTORNEY.

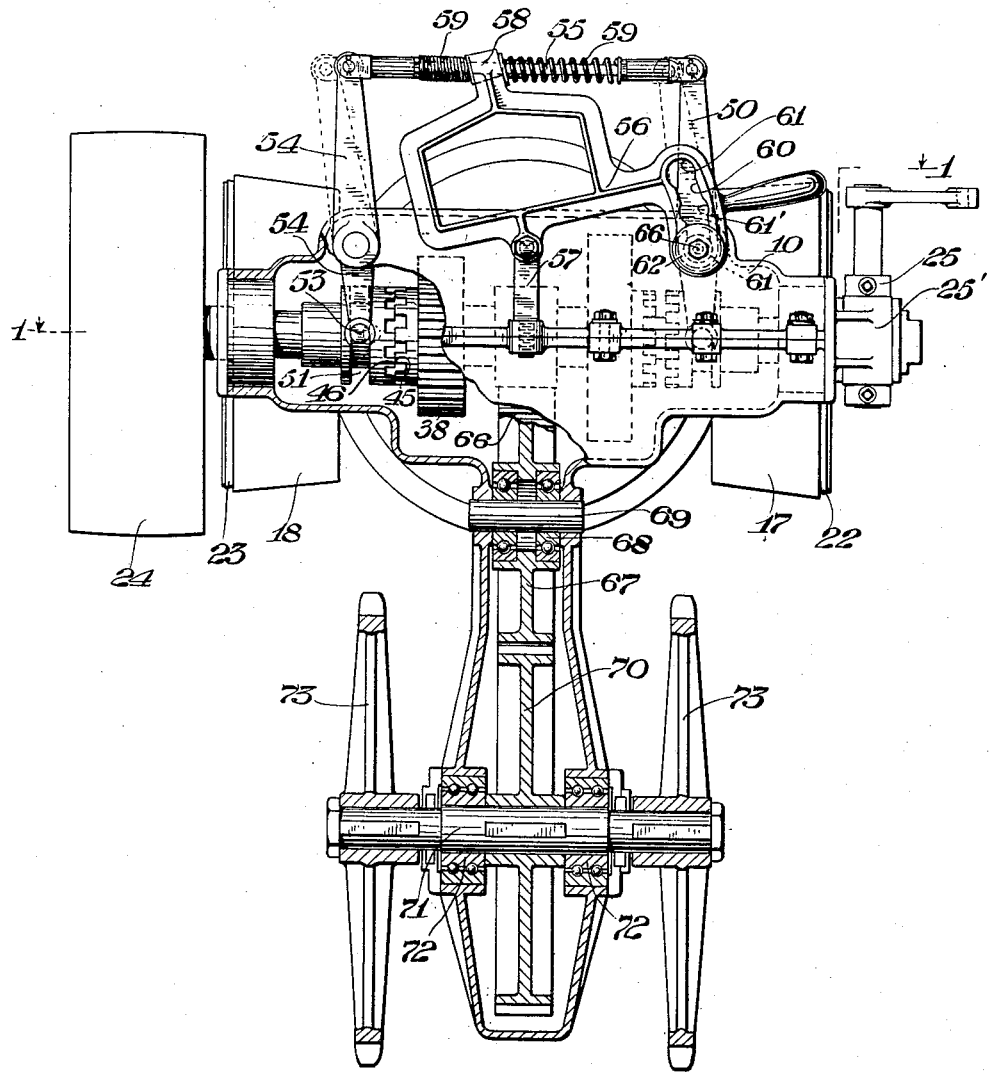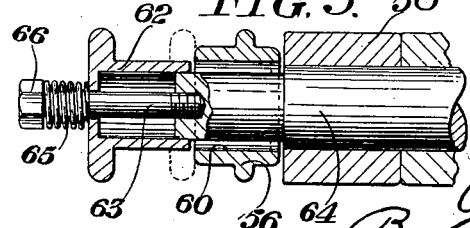

UNITED STATES PATENT OFFICE.

REX P. HICKS, OF MILWAUKEE, WISCONSIN, ASSIGNOR TO HICKS TRACTOR COMPANY, OF MILWAUKEE, WISCONSIN, A CORPORATION OF SOUTH DAKOTA.

POWER-TRANSMISSION MECHANISM.

1,324,592.     Specification of Letters Patent.     Patented Dec. 9, 1919.

Application filed May 12, 1919. Serial No. 296,341.

*To all whom it may concern:*

Be it known that I, REX P. HICKS, a citizen of the United States, and resident of Milwaukee, in the county of Milwaukee and State of Wisconsin, have invented new and useful Improvements in Power-Transmission Mechanism, of which the following is a description, reference being had to the accompanying drawings, which are a part of this specification.

The invention relates to power transmission mechanism more particularly designed for tractors or other motor driven vehicles.

One of the objects of the invention is to provide a variable speed power transmission mechanism in which the gears are always in mesh and the speed changed by means of clutches connecting the gears in driving relation with the driven shaft.

Another object of the invention is to provide a variable speed power transmission mechanism in which the gears are always in mesh and in which reversal of drive is accomplished by clutch mechanisms.

A further object of the invention is to provide a variable speed power transmission mechanism in which the change speed gears are always in mesh with the driving gears and are secured in driving relation with the driven shaft by means of reversely operated clutches moved by a common actuating means.

A further object of the invention is to provide a simple form of claw clutch shifting means in which the movable clutch members are yieldingly connected to the shifting lever so that the clutch members may be readily moved into mesh with their coöperating members.

The invention further consists in the several features hereinafter set forth and more particularly defined by claims at the conclusion hereof.

In the drawings:

Fig. 2 is an end elevation view with parts in section along the line 2—2 of Fig. 1.

Fig. 3 is a detail sectional view of the shifting lever lock.

Figure 1:
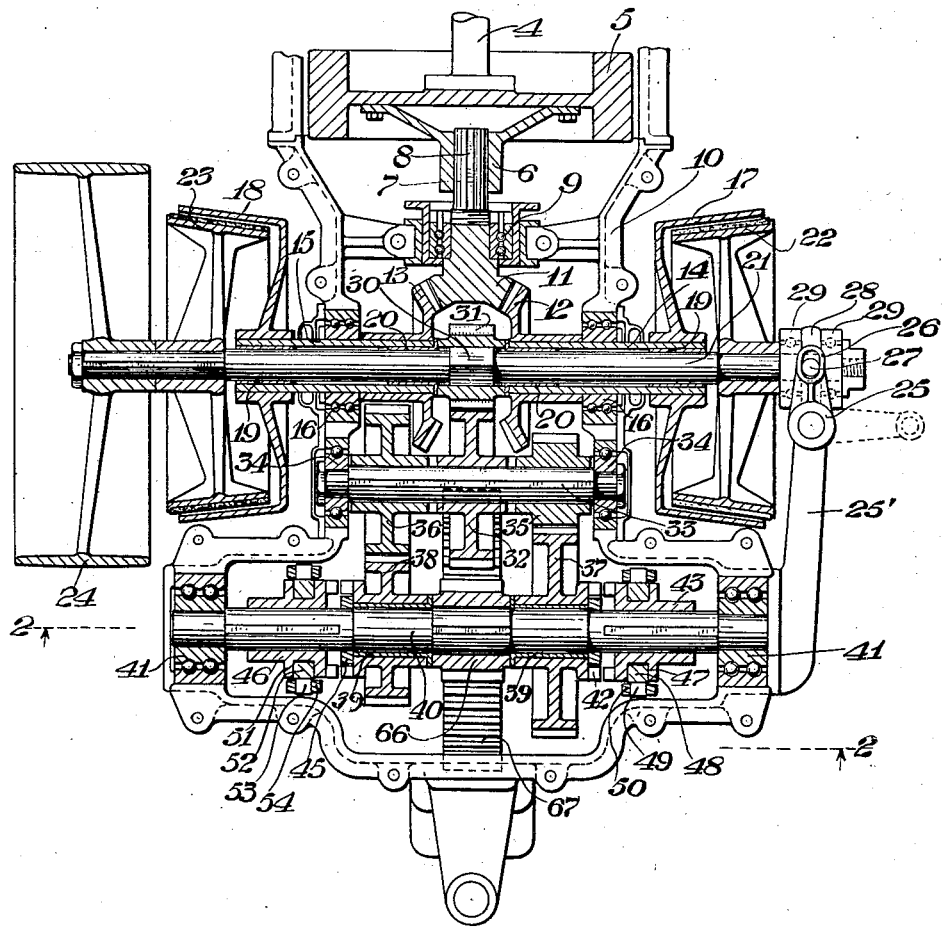
Figure 1 is a sectional view through the transmission mechanism embodying the invention, taken on line 1—1 of Fig. 2.

In the drawings the numeral 4 refers to the engine crank shaft carrying the fly wheel 5, which has a socket member 6 mounted thereon slidably receiving a shaft 7 having a key 8 thereon to engage a keyway in the socket of said member to form a driving connection. The shaft 7 is journaled in a ballbearing 9 carried by the transmission casing 10 and is provided with a bevel gear 11.

The bevel gear 11 meshes with bevel gears 12 and 13 respectively secured to hollow shafts 14 and 15 journaled in bearings 16 mounted in the casing 10. The shaft 14 carries a female friction cone 17 and the shaft 15 a female friction cone 18. The shafts 14 and 15 have bushings 19 and 20 therein in which a shaft 21 is journaled. The shaft 21 carries a male friction cone 22 adjacent one end and a male friction cone 23 near the other end with a drive pulley 24 at this end for auxiliary power purposes. The cones 22 and 23 respectively coöperate with the cone wheels 17 and 18 to drivingly connect either the shaft 14 with the shaft 21 or the shaft 15 with the shaft 21, so as to drive said shaft in opposite directions. The shaft 21 may be shifted to actuate the cone friction clutches above described by any suitable means as a bell crank lever 25 pivotally mounted on an arm 25' and having a slotted end 26 receiving pins 27 mounted on a collar 28 loosely mounted on the shaft 21 between bearings 29. The shaft 21 has a squared central portion 30 to form a keyed connection for a gear 31 mounted thereon between the gears 12 and 13 and bushings 20. This gear 31 meshes with a gear 32 secured to a shaft 33 mounted in bearings 34 in the casing 10.

The shaft 33 has change speed gears 35 and 36 keyed thereto and always in mesh respectively with change speed gears 37 and 38 loosely mounted on bushings 39 upon a shaft 40 journaled in bearings 41 in the casing 10. The gear 37 has a claw clutch portion 42 forming one of the elements of a claw clutch, the other element of which is the member 43 slidably but non-rotatably mounted on the shaft 40. The gear 38 has a claw clutch portion 45 forming one of the elements of a claw clutch, the other element of which is a member 46 slidably but non-rotatably mounted on the shaft 40.

The clutch member 43 has an annular groove 47 therein revolubly receiving a half ring 48 carrying pins 49 pivotally mounted in the forks of a shifting lever 50. The clutch member 46 has an annular groove 51 therein revolubly receiving a half ring 52 carrying pins 53 pivotally mounted in the forks of a shifting lever 54. The levers 50 and 54 are each pivotally supported intermediate their ends upon the casing 10 and are connected together at their outer ends by a link 55. Thus when the levers are shifted in one direction one of the claw clutches is in to connect up its change speed gear set while the other is out and when said levers are moved in the opposite direction the former clutch is out while the latter clutch is in connecting up its gear set and in midposition of the levers both clutches are thrown out.

To actuate the levers 50 and 54 a shifting lever 56 is pivotally mounted on a vertical post 57 and has a slotted part 58 through which the link 55 passes and springs 59 are interposed between the sides of the part 58 and shouldered portions of the link, (Fig. 2.) With this construction should the teeth of the opposed switch members of one of the claw clutches be out of mesh when the lever 56 is moved to throw in this clutch, then the movement of said lever compresses the spring 59 against which it moved and thereafter as soon as the relative movement of the clutch members permits their meshing with each other, the spring compressed by the lever 56 automatically throws in the clutch by its action upon the lever, such as 54, which is connected to the movable clutch element, such as 46.

To secure the lever 56 in different positions it is provided with an arcuate slot 60 having notches 61 at its ends and a set of notches 61' so that a lock button 62 may be inserted in either of the notches 61 or the notches 61' to retain the lever in the desired set position, said button being slidably mounted on a pin 63 mounted in the end of a pivotal support 64 for the lever 50 and being normally moved to locking position by a spring 65 interposed between the top of the button and a nut 66 on the rod. The slot 60 is narrower than the diameter of the button so that the button is held out of locking engagement until one of the notches are brought into register with it, at which time it is moved into said notch by the spring 65.

The shaft 40 has a gear 66 keyed thereto meshing with an idler gear 67 journaled in a ballbearing journal 68 on a fixed shaft 69. The gear 67 also meshes with a gear 70 on a shaft 71 journaled in bearings 72 mounted in the casing 10 and carrying drive sprockets 73 for driving an endless tread (not shown) though it will be understood that said shaft 71 may be connected up to any mechanism or wheels to be driven.

With the construction above described with the lever set in the position, shown in Fig. 2, for high speed, as soon as the gear 38 has turned a short distance the spring 59 shifts the levers 54 and 50 into the dotted line positions, at which time the claw clutch 46, 45 will be thrown in and the drive to the shaft 70 will be through the gears 36, 38, 66, 67 and 70 and said shaft will be turned in a direction which depends upon which of the cone friction clutches 17, 22 or 18, 23 is thrown in, the engine shaft being turned always in the same direction. For slow speed the shaft 56 is unlocked and moved so that the button engages in the upper notch 61, in which instance the clutch 42, 43 is in and the shaft 40 is drivingly connected to the shaft 33 through the gears 35 and 37. When the lever 57 is moved to bring the button into register with the notch 61' the claw clutches are in neutral position.

In actual practice the position of the lever 56 is set for either one of the two speeds before starting work with the tractor and thereafter the starting and stopping of the drive is effected by the shifting of the shaft 21 and the clutch mechanisms associated therewith, which also provide for reversal.

From the foregoing description it will be noted that the gears are always in mesh and that the change of speed and reversal is effected by clutch mechanisms.

Various changes may be made in the construction and arrangement of parts shown without departing from the spirit and scope of the invention and I, therefore, desire it to be understood that this invention is not limited to any specific form or arrangement of parts except as such limitations are specified in the claims.

What I claim as my invention is:

1. In a power transmission mechanism, the combination of a drive shaft, a driven shaft, a slow speed gearing set and a high speed gearing set between said shafts, one of the gears of each set being loosely mounted on one of the shafts, claw clutches for connecting said loose gears in driving relation with the shaft on which they are mounted, and means for operating said clutches, comprising clutch shifting levers, a link connecting said levers together, an actuating member, and a yielding connection between said actuating member and link.

2. In a power transmission mechanism, the combination of a drive shaft, a driven shaft, a slow speed gearing set and a high speed gearing set between said shafts, one of the gears of each set being loosely mounted on one of the shafts, claw clutches for connecting said loose gears in driving relation with the shaft on which they are mounted, and means for operating said clutches comprising a shifting lever for each clutch, a link connecting said shifting levers together, an actuating member, and compressible spring connections between said member and link.

3. In a power transmission mechanism, the combination, of a drive shaft, a driven shaft, change speed gearing connections between said shafts, clutch mechanisms connecting said gearing connections in driving relation with said shafts, clutch levers for shifting said clutch mechanisms alternately into and out of clutching relation, a common actuating lever operatively connected to said clutch levers and having a notched slot therein, and a spring pressed button for securing said actuating member in position when inserted in any of the notches in said slot.

4. In a power transmission mechanism, the combination, with a pair of alternately operable clutches, of a shifting lever for each clutch, a link connecting said shifting levers together, an actuating member, a yielding connection between said member and link, and means for locking said member in different positions of adjustment.

5. In a power transmission mechanism, the combination, with a pair of alternately operable clutches, of a shifting lever for each clutch, a common actuating lever operatively connected to said clutch levers and having a notched slot therein, and a spring pressed button for securing said actuating member in position when inserted in any of the notches in said slot.

6. In a power transmission mechanism, the combination, with a pair of alternately operable jaw clutches, of a shifting lever for each clutch, a link connecting said shifting levers together, an actuating member, and compressible springs on said link and operatively connecting the member with the link for the purpose described.

7. In a power transmission mechanism, the combination, with a pair of alternately operable jaw clutches, of a shifting lever for each clutch, a link connecting said shifting levers together, an actuating member having a part slidably mounted on said link, and compressible springs mounted on said link on opposite sides of said part and abutting against said part to be compressed by the movement of said actuating member when the shifting levers are prevented from movement and thereafter automatically shift said levers when such movement is permitted.

In testimony whereof I affix my signature in presence of two witnesses.

REX P. HICKS.

Witnesses:
R. S. C. CALDWELL,
H. D. CHASE.